Figure 1:
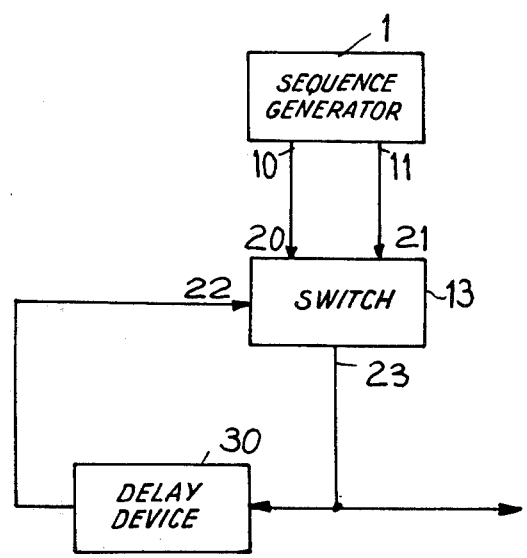

United States Patent [19]

Vasseur

[11] 4,181,816

[45] Jan. 1, 1980

[54] DEVICES FOR COMBINING RANDOM SEQUENCES, USING ONE OR MORE SWITCHING OPERATIONS

[75] Inventor: Jean-Pierre Vasseur, Paris, France

[73] Assignee: Thomson - CSF, Paris, France

[21] Appl. No.: 813,100

[22] Filed: Apr. 3, 1969

[30] Foreign Application Priority Data

Apr. 10, 1968 [FR] France .................................. 68.147659

[51] Int. Cl.² .............................................. H04L 9/04
[52] U.S. Cl. .................................... 178/22; 179/1.5 E;
179/1.5 M; 179/1.5 S
[58] Field of Search .............. 179/1.5 E, 1.5 M, 1.5 S;
178/22

[56] References Cited

U.S. PATENT DOCUMENTS

| | | | |
|---|---|---|---|
| 2,401,464 | 6/1946 | Corderman | 179/1.5 S |
| 3,038,028 | 6/1962 | Henze | 178/22 |
| 3,170,033 | 2/1965 | Vasseur | 178/22 |
| 3,370,126 | 2/1968 | Scidmore | 179/1.5 |
| 3,411,089 | 11/1968 | Gicca | 179/1.5 E |

Primary Examiner—Malcolm F. Hubler
Attorney, Agent, or Firm—Cushman, Darby & Cushman

[57] ABSTRACT

In a circuit for producing pseudo-random sequences of digits, using at least one switch to the inputs of which sequences of digits are applied, the control signals determining the connections established by the switch between its inputs and its outputs, are made a function of signals previously supplied by at least one of the outputs of the switch.

3 Claims, 2 Drawing Figures

DEVICES FOR COMBINING RANDOM SEQUENCES, USING ONE OR MORE SWITCHING OPERATIONS

The present invention relates to an improvement in devices for generating pseudo-random sequences of binary digits, which devices find a particularly important application in key generators for cipher links.

It is well known that it is possible to set up a link of this kind using two identical, synchronized key generators, one located in the transmitter and the other in the receiver, the first producing in respect of each number representing a plain-language or "clear" character, another number known as the key number, which latter is combined with the first in order to form the number representing the enciphered letter, and the second producing the same key number, which is combined with the number representing the enciphered letter in order to reconstitute the number representing the clear letter.

The essential requirement which a key generator has to meet is therefore that of producing a sequence of key numbers of pseudo-random nature, that is to say which, while obeying strictly predetermined laws (and this is necessary for the sequences of key numbers delivered by the two key generators to be identical), nevertheless present the most unexpected appearance possible to a third party (and this is necessary where the secrecy of the link is concerned).

This result is arrived at through a step-by-step process, that is to say by improving the pseudo-random nature of successively generated sequences of numbers, in several stages.

Since a number is made up of digits, the problem comes back to one of generating sequences of pseudo random digits, which sequences must have the least possible degree of correlation between one another.

At this point, a number of terms and symbols utilized later on in the present description, will be defined.

A digit in a sequence will be designated by a letter carrying an index characteristic of the sequence, and a subscript characteristic of the position number of the digit in the sequence.

Two sequences of digits $a_i^1$ and $a_i^2$ will be referred to as simultaneous if, whatever i is, $a_i^1$ and $a_i^2$ appear simultaneously at two terminals of a circuit.

One of the known methods of obtaining from N simultaneous input sequences, N' simultaneous output sequences (N' generally being smaller than N) of improved pseudo-random character, consists in utilizing a switch having N signal inputs to which the N input sequences, which are preferably pseudo-random sequences, are applied, N' outputs, and a number of control inputs to which "pseudo-random" control signals are applied, which link each of the N' outputs to one of the N inputs.

In accordance with the present invention there is provided a device, having at least one output, for delivering thereto a pseudo-random sequence of digits, said device comprising: at least one switch having N signal inputs, C control inputs, and N' outputs, N, C and N' being positive integers; means for respectively applying to said N signal inputs the successive digits of N sequences respectively associated with said N signal inputs; and a control system, having C outputs, respectively connected to said C control inputs, for respectively delivering thereto C control signals for each group of N digits simultaneously applied to said N signal inputs, said control system having at least one input connected to one of said N' outputs for receiving therefrom successive input digits, and including delaying means for delaying the action of said input digits of said control system on said control signals.

An arrangement of this kind, as those skilled in the art will readily appreciate, makes it possible to achieve an improvement in the complexity of the output signals for a given number of originally available pseudo-random sequences.

Figure 2:
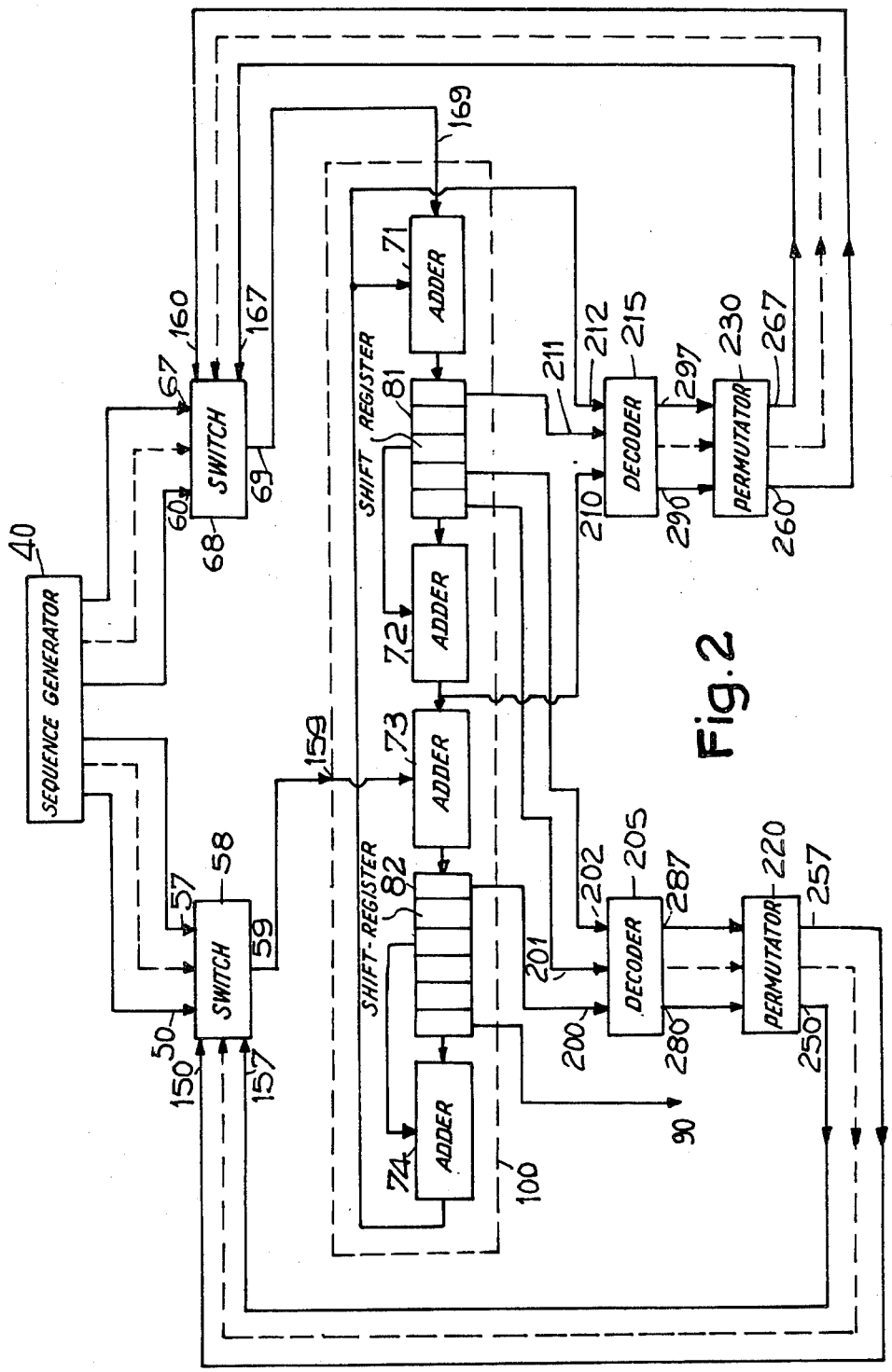

For a better understanding of the invention and to show how the same may be carried into effect reference will be made to the drawing accompanying the following description and in which:

FIG. 1 is a diagram of a device which illustrates in a very simple manner the principle of the invention; and FIG. 2 is the diagram of a device, which implements the invention in a more complex way.

The invention will be described in terms of the most widely occurring case, namely that in which the binary system is used.

It will also be assumed, although this is in no way limitative of the scope of the invention, that the digits "0" and "1" are respectively expressed by two voltage levels of predetermined duration T appearing on one and the same wire, two successive signals being contiguous.

FIG. 1 illustrates a device which is of limited interest in view of its very much simplified form, but which will suffice to provide a grasp of the fundamentals with which the present invention is concerned.

FIG. 1 shows a generator 1 producing two pseudo-random sequences furnished respectively at the outputs 10 and 11 which are respectively connected to the two inputs 20 and 21 of a switch 13, the latter also having a control input 22 and a single output 23.

The switch 13 is designed in such a manner that it connects its output 23 to its input 20 or to its input 21 depending upon whether the signal "0" or the signal "1" is applied to its control input 22.

It will be assumed first of all, disregarding for the moment the connection shown between the output 23 and the control input 22 of the switch, that the latter, in the conventional way, receives by way of control signals, the digits of an auxiliary sequence, $c_n$, the input signals to the switch being designated $e_n^0$ and $e_n^1$.

Under these conditions, the output signal from the switch can be written, for the $n^{th}$ digit:

$$S_n = e_n^0(1-c_n) + e_n^1 c_n.$$

There is thus a relatively simple law for the combination of three available sequences $e_n^0$, $e_n^1$, $c_n$.

In accordance with the principle of the present invention, the output 23 is connected to the input of the switch by a delay device 30 which delays the input signal thereof by a time interval equal to the duration T.

The expression for the output signal therefore becomes:

$$s_n = e_n^0(1-s_{n-1}) + e_n^1 s_{n-1}$$

which may be written, modulo 2, as :

$$s_n = e_n^0 + (e_n^0 + e_n^1)s_{n-1}$$

and, in series form, calling $S_n$ the modulo 2 sum of the two input digits with position number n, there is obtained:

$$s_n = e_n^0 + S_n e_{n-1}^0 + S_n S_{n-1} e_{n-2}^0 + \ldots + S_n S_{n-1} \ldots S_2 s_1.$$

If the last coincidence (two "0" or two "1" signals) between the two input sequences has occurred at position number j ($j \leq n$), there is obtained:

$$s_n = e_n^0 + e_{n-1}^0 + \ldots + e_{j+1}^0 + e_j^0$$

and in the absence of any coincidence for values of $j \leq n$, there is obtained:

$$s_n = e_n^0 + e_{n-1}^0 + \ldots + e_2^0 + s_1$$

$s_1$ being equal to $e_1^0$ or $e_1^1$, depending upon the initial position of the switch.

The expression for $s_n$ changes completely as soon as a new coincidence arises, and this is something which a priori has a one-in-two chance of happening.

It will therefore be seen that the two input sequences, even in this ultra-simple case, are combined in a complex way, one of the two input sequences playing the part of selector vis-a-vis the other.

However, the application of the invention has much wider possibilities when considered in terms of complex circuits. In particular, as far as economy of means is concerned, one and the same delay device can be used in order to combine the output signals from the switch (or several switches) in order to produce on the one hand new further-improved sequences, and on the other the control signals for the switch (or switches).

FIG. 2 is the diagram of a wire-reducing device in which this improvement is applied. It will be remembered that in the art under consideration, a wire-reducing device is a device which produces R random sequences from E input sequences, where $R < E$.

As before, a binary system is employed and the same hypotheses are made in respect of the signals.

In this figure, an arrangement of complex circuits 40, produces at 16 outputs E=16 pseudo-random simultaneous primary sequences from which there will ultimately be formed R=1 highly complex sequence.

The first eight sequences are applied to the eight signal inputs 50 to 57 of a switch 58 having a single output 59.

The switch 58 has 8 control inputs 150 to 157 and connects its output to the signal input 50+i when its control input 150+i selectively has a predetermined voltage applied to it.

The eight other outputs of the circuits 40 supply an identical device in which those elements corresponding to similar elements in the preceding device are marked with the same reference numbers, augmented by 10.

The device of FIG. 2 also comprises an apparatus which will be referred to hereinbelow and in the claims as a "complex converter", i.e. a combination of m shift registers, the input stage of which receives, in addition to a signal from an external circuit, a feed back signal, but the feed back signals being circularly permutated, i.e. the feed back signal formed from output signals of the $j^{th}$ shift register being applied to the input stage of the $(j+1)^{th}$ shift register and so on.

The complex converter 100 comprises, in series (this arrangement being understood, in the case of an adder, as the insertion thereof in the series arrangement through its first input and its output):

An adder 71, a shift-register 81 with 5 stages, an adder 72, an adder 73, a shift-register 82 with 6 stages, and an adder 74. All the adders are modulo 2 adders.

The stages of the shift-registers have been shown schematically by sub-divisions of the boxes 81 and 82.

It should be pointed out at this juncture that a shift-register transfers the information from one stage to the next with each shift pulse that it receives.

The conventional synchronizing device, which supplies the shift pulses to the registers 81 and 82 in synchronism with the succession of digits of the sequences produced by the generator 40, has not been shown in order not to overencumber the drawing.

This being understood, the complex converter 100 comprises two inputs 169 and 159 corresponding with an input of the adder 71 and a second input of the adder 73, these inputs 169 and 159 being respectively connected to the outputs 69 and 59 of the switches 68 and 58, which thus supply to the complex converter two external signals.

An auxiliary output of the third stage of the register 82 is connected to the second input of the adder 74 whose output signal is applied to the second input of the adder 71; an auxiliary output of the third stage of the register 81 is connected to the second input of the adder 72.

Calculation shows that the shift-register generator 100, when in autonomous behaviour, that is to say without the external signals being fed thereto, would have a periodicity P of $2^{11} - 1 = 2047$, that is to say that the assembly of stages of the register will only return to their initial condition (this condition being assumed to be other than zero in respect of all the stages), when the $2048^{th}$ shift pulse appears.

In other words, the complex converter has been so chosen as to operate, in autonomous behaviour, as a shift register generator with a maximum period (see Peterson, Error Correcting Codes, Wiley and Son).

The converter 100 has 7 outputs, the first of which 90, connected to an auxiliary output of the last stage of the register 82 is the output of the apparatus, delevering the digits $s_n$ of the output pseudo-random sequence of digits, which digits can be used to form one of the digits of the key number in a key generator.

Three further outputs of the complex converter 100 respectively connected to the first stage of the register 82, and the fifth and fourth stages of the register 81, are connected to the inputs of a binary-decoder 205 with 8 outputs 280 to 287, which applies a given voltage to the output 280+i when the three-digit binary number formed by the digits applied to its inputs 200, 201, 202 is equal to i (the digit applied at 200 being weighted by 1, that applied to the input 201 by 2 and that applied to the input 202 by 4). A permutator 220, the 8 inputs of which are respectively connected to the outputs of the decoder, has 8 outputs 250 to 257 connected to the control inputs 150 to 157 of the switch 58.

A second circuit, identical to that just described, is provided in order to control the switch 68, those of its elements which correspond to similar ones in the first switch, being marked by the same reference numbers, augmented by 10. Its three inputs 210, 211 and 212 are respectively connected to the last three outputs of the complex converter, which outputs are respectively connected to the output of the adder 72, an auxiliary output of the first stage of the register 81, and the output of the adder 74.

The circuit which has just been described leads to the production of an output sequence, the law of which is virtually indecipherable and which moreover, because of the feed back affecting the control of the switches, can be further profoundly influenced by means of the adjustable permutating devices 220 and 230 or by modifying the initial setting of the registers 81 and 82, this furthermore with a remarkable degree of economy of means, the memory elements being reduced to 6+5=11 register stages.

Of course the invention is in no way limited to the embodiments described and illustrated here which were given solely by way of example.

What is claimed is:

1. A device comprising: at least one switch having N signal inputs, C control inputs, and N' outputs for respectively delivering thereto N' pseudo-random sequences of digits, N, C and N' being positive integers and N being greater than 1; means for respectively applying to said N signal inputs the successive digits of N sequences respectively associated with said N signal inputs; and a control system, having C outputs respectively connected to said C control inputs, for respectively delivering thereto C control signals for each group of N digits simultaneously applied to said N signal inputs, said control system having at least one input connected to one of said N' outputs for receiving therefrom successive input digits, and including delaying means for delaying the action of said input digits of said control system on said control signals.

2. A device as claimed in claim 1, for operation with binary digits, said device comprising p switches $S_i$, p being an integer, and i=1,2,...p, each switch $S_i$ having $N_i$ inputs, $N'_i$ outputs for respectively delivering thereto $N'_i$ pseudo-random sequences of digits and $C_i$ control inputs, the $N_i$, $C_i$ and $N'_i$ being integers and each integer $N_i$ being greater than 1; said control system comprising a complex converter comprising modulo 2 adders, each of said adders having inputs, the number of said modulo 2 adders being at least equal to the total number q of said outputs of said p switches, and respective inputs of q of said adders being respectively connected to said outputs of said switches, said complex converter comprising at least one main output for delivering thereto a further pseudo-random sequence of digits, and auxiliary outputs; said control system further comprising a plurality of decoders, each decoder having a plurality of inputs respectively fed by a plurality of said auxiliary outputs, and a plurality of outputs respectively coupled to a plurality of said control inputs of said switches.

3. A device as claimed in claim 1, wherein N' is greater than 2.

* * * * *